(12) United States Patent
Tai et al.

(10) Patent No.: US 10,741,074 B2
(45) Date of Patent: Aug. 11, 2020

(54) INDOOR POSITIONING ENERGY-SAVING LIGHTING DEVICE AND ITS NAVIGATION SYSTEM

(71) Applicant: Brilliant Systems. Inc., Zubei, Hsinchu County (TW)

(72) Inventors: Chia-Chan Tai, Zubei (TW); Cheng-Pang Liao, Zubei (TW)

(73) Assignee: Brilliant Systems, Inc., Zhubei (TW)

( * ) Notice: Subject to any disclaimer, the term of this patent is extended or adjusted under 35 U.S.C. 154(b) by 0 days.

(21) Appl. No.: 16/051,695

(22) Filed: Aug. 1, 2018

(65) Prior Publication Data
US 2020/0043338 A1 Feb. 6, 2020

(51) Int. Cl.
| | |
|---|---|
| *G08G 1/14* | (2006.01) |
| *G08G 1/123* | (2006.01) |
| *G01C 21/20* | (2006.01) |
| *H05B 47/105* | (2020.01) |
| *G01S 13/56* | (2006.01) |
| *H04W 4/02* | (2018.01) |
| *H04W 4/024* | (2018.01) |

(52) U.S. Cl.
CPC .......... *G08G 1/142* (2013.01); *G01C 21/206* (2013.01); *G08G 1/123* (2013.01); *H05B 47/105* (2020.01); *G01S 13/56* (2013.01); *H04W 4/024* (2018.02); *H04W 4/026* (2013.01)

(58) Field of Classification Search
CPC ...... G08G 1/123; G08G 1/142; G01C 21/206; H05B 37/0227; H04W 4/024; H04W 4/026; G01S 13/56
See application file for complete search history.

(56) References Cited

U.S. PATENT DOCUMENTS

| | | | | |
|---|---|---|---|---|
| 8,798,804 | B2 * | 8/2014 | Besore | G06Q 30/0261 236/51 |
| 9,301,092 | B2 * | 3/2016 | Huang | G01S 1/04 |

\* cited by examiner

*Primary Examiner* — Steven Lim
*Assistant Examiner* — Mancil Littlejohn, Jr.
(74) *Attorney, Agent, or Firm* — Alan D. Kamrath; Karin L. Williams; Mayer & Williams PC

(57) ABSTRACT

An indoor positioning energy-saving lighting device has a central processing module, a light source control module, a motion sensing module, a communication module, and an indoor positioning module. The light source control module, the motion sensing module, the communication module, and the indoor positioning module are electrically connected to the central processing module. The motion sensing module continuously sends out an identification code and a turn-on message. The motion sensing module senses a movement of an object or the communication module receives the light-on message, the light source control module controls the light source to illuminate, and the indoor positioning module is used to memorize the location information of other indoor positioning energy-saving lighting devices and position information of an external gyroscope received by the communication module.

6 Claims, 3 Drawing Sheets

INDOOR POSITIONING ENERGY-SAVING LIGHTING DEVICE AND ITS NAVIGATION SYSTEM

BACKGROUND OF THE INVENTION

1. Field of the Invention

The present invention relates to an indoor lighting device, and more particularly to an indoor positioning energy-saving lighting device that can save energy and cooperate with a mobile device to perform navigation.

2. Description of Related Art

When a parking lot of an existing building or an open space in a room needs to be illuminated, usually multiple conventional lighting devices are installed in a ceiling of the room corresponding to the area to be illuminated, and the entire room is lit by the illumination area where the light from the multiple conventional lighting devices overlap.

Although the conventional lighting devices described above are capable of illuminating the space in a room piece by piece when multiple conventional lighting devices are provided, since all of the conventional lighting devices or the conventional lighting devices in the same area are turned on or off by a single switch, they are all lit at the same time. When lighting in only some locations, all of the conventional lighting devices will still be turned on. It is a pity that the waste of energy generated in this way is a problem.

Furthermore, when a user parks in a parking lot of a building, the parking position is usually memorized by the planned area in the space and the number marked on the floor so that when leaving the building, the position number can be used when parking. Memories are retrieved from the parking lot, but due to the fact that human memories are easily forgotten or memory errors occur, there is a problem that the user cannot find his own vehicle when he returns to the parking lot.

The indoor positioning energy-saving lighting device and its navigation system in accordance with the present invention mitigate or obviate the aforementioned problems.

SUMMARY OF THE INVENTION

The main objective of the present invention is to provide an indoor positioning energy-saving lighting device that can save energy and cooperate with a mobile device to perform navigation.

The indoor positioning energy-saving lighting device in accordance with the present invention has a central processing module, a light source control module, a motion sensing module, a communication module, and an indoor positioning module. The light source control module, the motion sensing module, the communication module, and the indoor positioning module are electrically connected to the central processing module. The motion sensing module continuously sends out an identification code and a turn-on message. The motion sensing module senses a movement of an object or the communication module receives the light-on message, the light source control module controls the light source to illuminate, and the indoor positioning module is used to memorize the location information of other indoor positioning energy-saving lighting devices and position information of an external gyroscope received by the communication module.

Other objectives, advantages and novel features of the invention will become more apparent from the following detailed description when taken in conjunction with the accompanying drawings.

DETAILED DESCRIPTION OF THE PREFERRED EMBODIMENT

In order to understand the technical features and effects of the present invention in detail, and in accordance with the contents of the specification, the preferred embodiments shown in the figures are further described in detail as follows.

Figure 1:
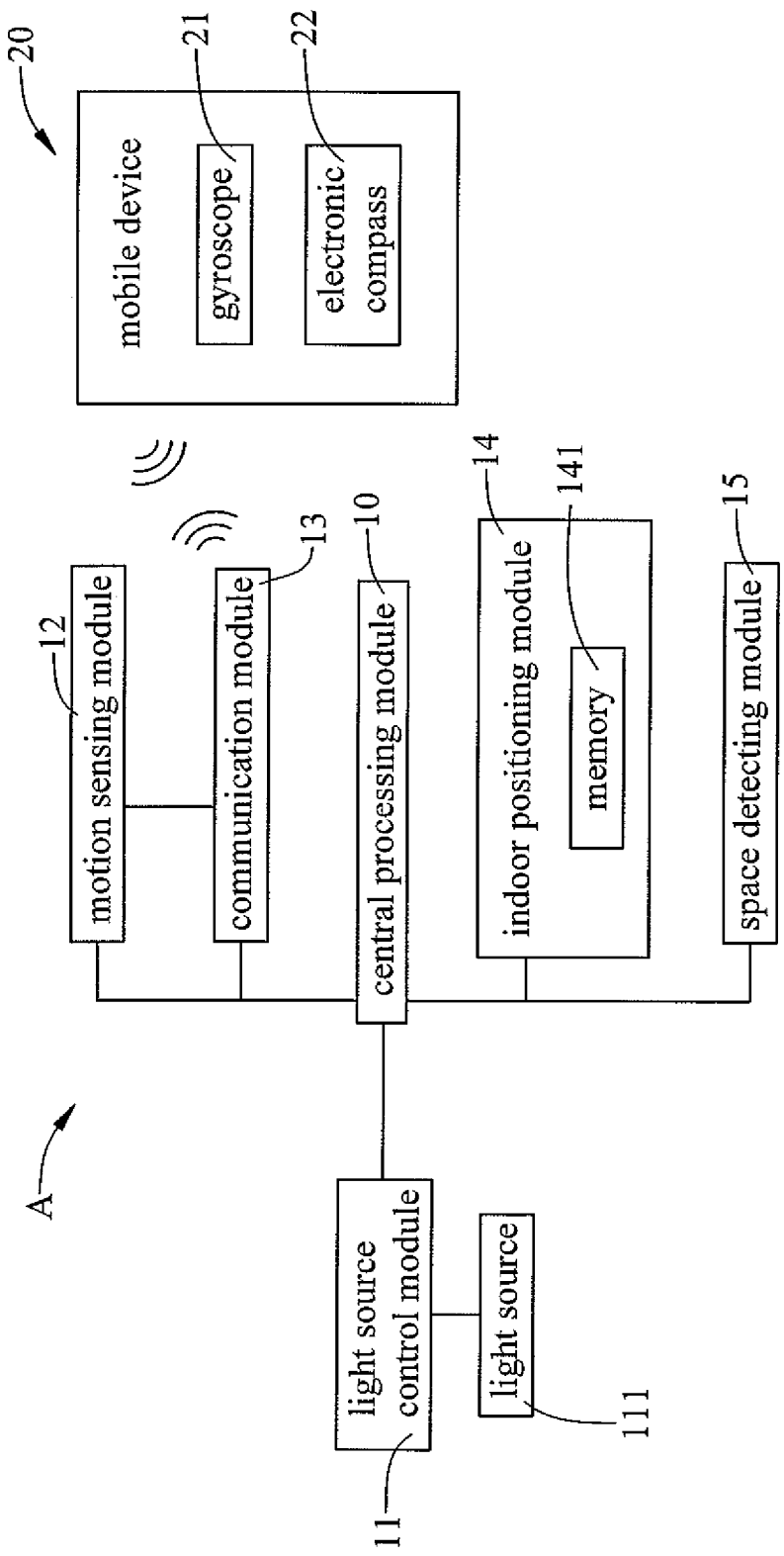
FIG. 1 is a block diagram of a preferred embodiment of an indoor positioning energy-saving lighting device in accordance with the present invention.

With reference to FIG. 1, a preferred embodiment of an indoor positioning energy-saving lighting device A in accordance with the present invention has a central processing module 10, a light source control module 11, a motion sensing module 12, a communication module 13, an indoor positioning module 14, and a space detecting module 15. The light source control module 11, the motion sensing module 12, the communication module 13, the indoor positioning module 14, and the space detecting module 15 are electrically connected to the central processing module 10.

The light source control module 11 is electrically connected to a light source 111. The motion sensing module 12 can be selected from infrared, ultrasonic, radar, or visual recognition sensors that can detect the movement of a moving object or a heating object for sensing. Whether a human body, a vehicle, or the like passes around the motion sensing module 12, the central processing module 10 causes the light source control module 11 to turn on the light source 111 and sends a light-on message to the communication module 13. The signal intensity of the light-on message can be controlled by the communication module 13, so as to control the reception range of the turn-on message. Furthermore, the communication module 13 continuously sends out an identification code (messages sent by the communication module 13 include the identification code) for allowing other devices such as a mobile device 20 or other devices to recognize the received message is sent out by which communication module 13. The communication module 13 also receives signals of the orientation information of a gyroscope 21 of the mobile device 20 sent by the mobile device 20.

The communication module 13 of other indoor positioning energy-saving lighting devices (within the valid acceptance range covered by the turn-on message) receive the turn-on message, and other light source control modules 11 of the indoor positioning energy-saving lighting devices control the light source 111. The lighting is gradually enhanced (or the lighting may be turned on directly). When the other communication module 13 of the indoor positioning energy-saving lighting device A does not receive the turn-on message anymore, the light source control module 11 of the indoor positioning energy-saving lighting device A controls the light source 111 gradually. The method of reducing the brightness is activated, allowing the light source to turn off, and the above-mentioned control mode of transmitting the turn-on message to make the surrounding light source 111 shine achieves the effect of the setting partitioned lighting in the space.

The indoor positioning module 14 has a memory 141. The memory 141 stores the position information of other lighting devices and the orientation information of the gyroscope 21 sent by the mobile device 20 around the communication module 13. The following two navigation modes are performed:

First, the mobile device 20 moves sequentially through the lighting ranges of two or more light sources 111 of indoor positioning energy-saving lighting devices. When the mobile device 20 spans two different indoor positioning energy-saving lighting devices, the range of identification codes is transmitted, and therefore the identification codes of the mobile devices 20 are sequentially received. In the case of different identification codes, the relative positions of the two indoor positioning energy-saving lighting devices are judged from the azimuth information of the gyroscope 21 of the mobile device 20, the relative positions of the respective pairs of the indoor positioning energy-saving lighting devices are combined to obtain position information and the mobile device 20 is ranked. The mobile device 20 moves from the first contacted indoor positioning energy-saving lighting device to the last contacted navigation path between the indoor positioning energy-saving lighting devices.

Figure 2:
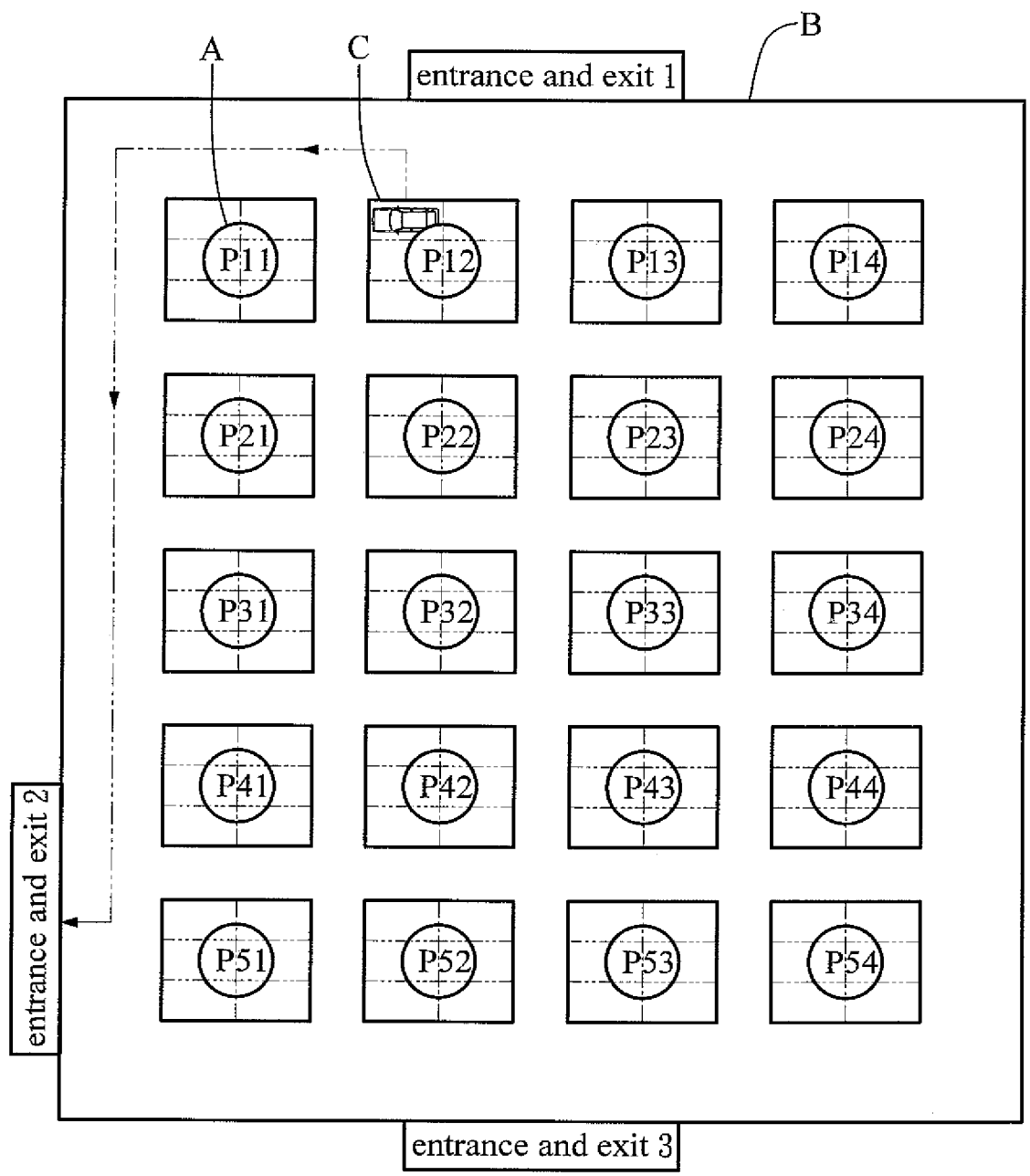
FIG. 2 is an operational top side view of a first embodiment of a navigation system in accordance with the present invention.

The above-mentioned first navigation mode, as shown in FIGS. 1 and 2, illustrates multiple of indoor positioning energy-saving lighting devices A of the present invention, and constitutes an indoor positioning energy-saving lighting device navigation system in an indoor space B. Further explanation of the system includes:

In an arrangement such as a matrix of spaces, multiple indoor-positioning energy-saving lighting devices A are disposed in an indoor space B of a parking lot, for example, and the lighting range of the multiple of indoor-positioned energy-saving lighting devices A covers the entire indoor space B. The identifiers of the multiple indoor-positioning energy-saving lighting devices A are numbered according to the matrix, and are sequentially set as P11, P12, P13 . . . P54 and so on. The range below each indoor-positioning energy-saving lighting device A is a parking space C, such as, in the preferred embodiment, six parking spaces C are provided below each indoor-positioning energy-saving lighting device A. The numbering mode of the foregoing identification codes is for ease of description in conjunction with the drawings. When a multiple of indoor-positioning energy-saving lighting devices A are initially installed in the indoor space B, the identification codes and relative positions of the energy-saving lighting devices A in each indoor location are not known.

A user or pedestrian driving the vehicle with the mobile device 20 enters the range of the indoor space B of the parking lot from the entrance and exit 1. During the process, the gyroscope 21 of the mobile device 20 immediately detects the position information of the mobile device 20 at the time. In addition to the orientation information provided to the mobile device 20, the mobile device 20 will also send orientation information to each indoor positioning energy-saving illumination device A that communicates with the mobile device 20. As shown in FIG. 2, after the user carries the mobile device 20 to park in a parking space C with an identification code of P12, the user carries the mobile device 20 to exit and passes the identification codes P12, P11, P21, P31, P41, etc. in sequence. The lighting range of the light source 111 of the energy-saving lighting device A is located, and finally exits the indoor space B from the entrance and exit 2.

When the mobile device 20 spans a range in which two indoor positioning energy-saving lighting devices A emit an identification code, for example, an indoor positioning energy-saving lighting device A that crosses the identification codes P12 and P11, it sequentially receives the identification codes of P12 and P11. From the azimuth information of the gyroscope 21 of the mobile device 20, the relative positions of the two indoor positioning energy-saving lighting devices A of P12 and P11 are determined. When the user continues to pass through P11, P21, P31, and P41, the foregoing judging mode is repeated, and the relative positions of the paired indoor positioning energy-saving lighting devices A are combined to obtain an indoor position including P12, P11, P21, P31, and P41. The location information of the indoor positioning energy-saving lighting device A may be used by the user when the user enters the indoor space B again from the entrance and exit 2 to match the position information detected by the gyroscope 21 of the mobile device 20. The mobile device 20 is navigated to the position of the indoor positioning energy-saving lighting device A of the P12, that is, the parking space C where the user's vehicle is located.

Second, a multiple of different indoor positioning modules 14 of the present invention transmit respective position information and orientation information of the gyroscope 21 of the mobile device 20 received by each communication module 13. After the same or different mobile devices 20 are moved between all of the indoor positioning energy-saving lighting devices, the position information (and the indoor positioning energy-saving lighting devices distinguished by identifiers) covering all the indoor positioning energy-saving lighting devices is obtained, and the position information is stored in each indoor positioning module 14. The location information is stored in the memory 141 of each indoor positioning module 14 or stored in the mobile device 20. When the mobile device 20 approaches one of the indoor positioning energy-saving lighting devices and receives its identification code, the location information is used to indicate a plurality of locations of the present indoor positioning energy-saving lighting devices, and the mobile device 20 can be guided by the orientation information of the mobile device 20 of the mobile device 20 to a particular location.

The space detecting module 15 is a module for identifying whether a vehicle exists, and may be, for example, a visual recognition module for detecting the appearance of a vehicle, a radar for detecting the presence of a vehicle, or an ultrasonic module for detecting vehicle reflection. By means of the above method, it is determined whether there is an empty parking space within the range set below the space detecting module 15, and if an empty parking space is detected, an empty parking space message with an identification code is sent out through the communication module 13. The center processing module 10 selectively causes the light source control module 11 to drive the light source 111 or an additional warning light to flash, indicating that there is an empty parking space in the illumination range of the light source 111 or the range displayed by the warning light. The other communication module 13 of the present indoor positioning energy-saving lighting devices receives the empty parking space message and stores the empty parking space information in the memory 141, and also forwards the empty parking space information with the identification code, and transmits the communication modes of the present indoor positioning energy-saving lighting devices. The group of communication modules 13 communicates empty parking spaces with each other so that each of the indoor positioning energy-saving lighting devices can indicate which of the indoor positioning energy-saving lighting devices has an empty parking space in the location information, when the mobile device 20 having the location information receives the empty parking space message. It can also indicate which of the location information in the location information has an empty parking space.

Figure 3:
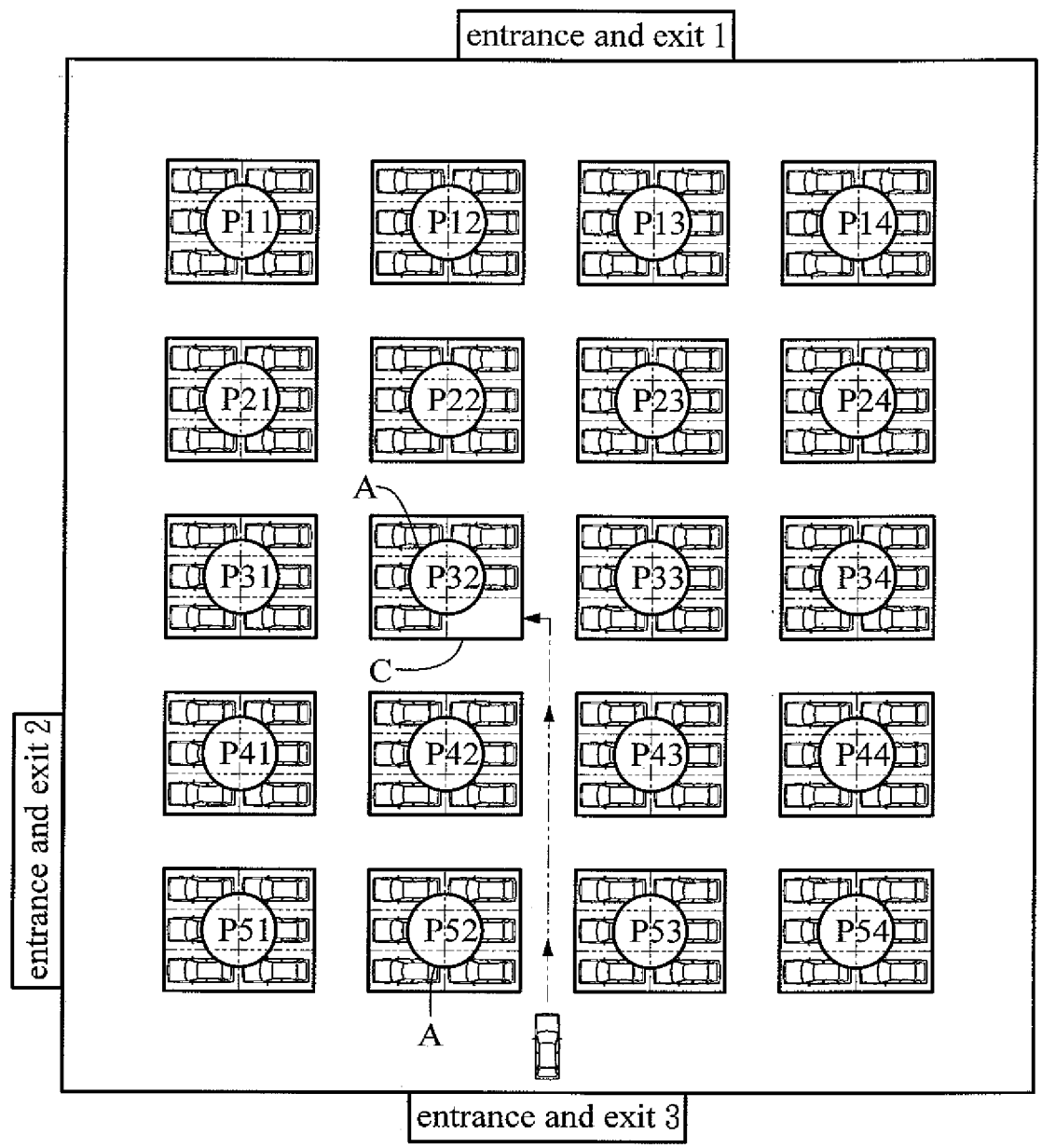
FIG. 3 is an operational top side view of a second embodiment of a navigation system in accordance with the present invention.

The above-mentioned second navigation mode, as shown in FIGS. 1 and 3, has multiple indoor positioning energy-saving lighting devices A of the present invention, and constitutes an indoor positioning energy-saving lighting device navigation system in an indoor space B. Further explanation of the system includes:

For example, a multiple of indoor positioning energy-saving lighting devices A are installed in an indoor space B of a parking lot, for example, in a matrix arrangement. The identification numbers of the multiple of indoor positioning energy-saving lighting devices A are numbered in accordance with the matrix, and are set in order P11, P12, P13 . . . P54, and so on, the range below the indoor positioning energy-saving lighting device A is the parking space C. Before the system is used, the mobile device 20 is first used to move through all indoor positioning energy-saving lighting devices A to obtain position information covering all indoor positioning energy-saving lighting devices A, and this position information is stored in each indoor positioning energy-saving lighting device A. The location information is stored in the memory 141 of each indoor positioning energy-saving lighting device A, or is stored in the user's mobile device 20, and the location information is uploaded to the communication module 13 or the mobile device 20 can be connected. The network cloud server obtains the location information (the mobile devices 20 entering the indoor space B can obtain the location information by communicating with any indoor positioning energy-saving lighting device A, or the mobile device 20 can pass through the network and obtain the location information that has been uploaded to the web cloud server).

The space detecting module 15 of each indoor positioning energy-saving lighting device A detects an empty parking space at the corresponding parking space C, and sends an empty parking space message to the communication module 13, for example, indoor positioning of the P32. The position of the energy-saving lighting device A is empty, and the empty parking space message is transmitted between all indoor positioning energy-saving lighting devices A. By counting the number of empty parking spaces, the number of empty parking spaces included in the indoor space B can be displayed outside the parking lot. When the user of the driving vehicle carries the mobile device 20 and enters the range of the indoor space B of the parking lot from the entrance and exit 3, the message of the number of empty parking spaces included in the indoor space B can be received and displayed on the mobile device 20. Receiving the identification code of the indoor positioning energy-saving lighting device A adjacent to the number P52 through the mobile device 20, and obtaining the position of the mobile device 20, the user and the vehicle in the location information, and setting the starting point, and then having the empty parking space of the indoor positioning energy-saving lighting device A as the end point, the orientation information of the gyroscope 21 is matched, the navigation path of the indoor positioning energy-saving lighting device A to the empty parking space is planned in the position information, and the mobile device 20 navigates to the empty parking space.

In the above preferred embodiment of the present invention, the communication module 13 may further utilize the gyroscope transmitted from the mobile device 20 in addition to receiving the signals of the orientation information of the gyroscope 21 sent by the mobile device 20. The signal of the gyroscope 21 together with the signal of the electronic compass 22 of the mobile device 20 together improve the navigation accuracy of the present invention and change the two navigation modes of the present invention as follows:

When the first navigation mode described above is performed by the present indoor positioning energy-saving lighting device and navigation system, when the mobile device 20 transmits a range of identification codes across two different indoor positioning energy-saving lighting devices, and thus receives different identification codes in sequence, the 21 of the mobile device 20 determines the absolute position of the present indoor positioning energy-saving lighting device in accordance with the orientation information of the electronic compass 22, and combines the absolute positions of the pair of the present indoor positioning energy-saving lighting devices to obtain position information and the first contact of the mobile device 20. The navigation path between the indoor positioning energy-saving lighting devices moved to the last contact is provided.

When the second navigation mode described above is performed by using the present invention, a multiple of different indoor positioning modules 14 of the indoor positioning energy-saving lighting devices transmit respective position information and the gyroscope 21 of the mobile device 20 cooperates with the orientation information of the electronic compass 22 received by each communication module 13, and when the same or different mobile device 20 moves between all the indoor positioning energy-saving lighting devices, the position information covering all the absolute positions of the present indoor positioning energy-saving lighting devices is obtained (and the identification code is used). The location information is stored in the memory 141 of each indoor positioning module 14 or stored in the mobile device 20. When the mobile device 20 approaches one of the indoor positioning energy-saving lighting devices and receives its identification code, the location information is used to indicate a plurality of locations of the present indoor positioning energy-saving lighting device, and the mobile device 20 can be guided by the orientation information of the mobile device 20 to a particular location of the indoor positioning energy-saving lighting devices.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. An indoor positioning energy-saving lighting device comprising:
   a central processing module;
   a light source control module electrically connected to the central processing module and a light source;

a motion sensing module electrically connected to the central processing module and continuously send out an identification code and a turn-on message;
a communication module electrically connected to the central processing module; and an indoor positioning module electrically connected to the central processing module, wherein the indoor positioning module has a memory;
wherein when the motion sensing module senses a movement of an object or the communication module receives the turn-on message, the light source control module controls the light source to illuminate, and the indoor positioning module is used to store the location information of other indoor positioning energy-saving lighting devices and position information of an external gyroscope received by the communication module where the position information is matched with orientation information of an electronic compass, and
wherein the position information of the other indoor positioning energy-saving lighting devices is received by the communication module
wherein the external gyroscope cooperates with the orientation information of the electronic compass and is stored in the memory.

2. The indoor positioning energy-saving lighting device as claimed in claim 1, wherein the central processing module is electrically connected to a space detecting module, the space detecting module configured to identify whether a vehicle exists.

3. An indoor positioning energy-saving lighting device navigation system comprising:
a multiple of indoor positioning energy-saving lighting devices as claimed in claim 1 disposed in an indoor space in a spaced relationship; and
a mobile device, having a gyroscope, wherein the mobile device sequentially passes an illumination range of a light source of two or more of the multiple indoor positioning energy-saving lighting devices, and the mobile device transmits the identification code range across two indoor positioning energy-saving lighting devices, when the different identification codes are received, relative position of the two indoor positioning energy-saving lighting devices is determined by orientation information of the gyroscope of the mobile device, and the relative positions of the paired indoor positioning energy-saving lighting devices are combined to obtain a position information, and navigate the mobile device with the position information.

4. The indoor positioning energy-saving lighting device navigation system as claimed in claim 3, wherein the mobile device locates the illumination range of the energy-saving lighting device through all of the indoor positioning energy-saving lighting devices, so that the location information indicates the locations of all indoor energy-saving lighting devices.

5. The indoor positioning energy-saving lighting device navigation system as claimed in claim 3, wherein the mobile device has an electronic compass, and the orientation information of the gyroscope received by the communication module of the indoor positioning energy-saving lighting device matches the information of the electronic compass, and the orientation information of the gyroscope together with the orientation information of the electronic compass are stored in the memory of the indoor positioning energy-saving lighting device.

6. The indoor positioning energy-saving lighting device navigation system as claimed in claim 4, wherein the mobile device has an electronic compass, and the orientation information of the gyroscope received by the communication module of the indoor positioning energy-saving lighting device matches the information of the electronic compass, and the gyroscope together with the orientation information of the electronic compass are stored in the memory of the indoor positioning energy-saving lighting device.

\* \* \* \* \*